United States Patent
Hou et al.

(10) Patent No.: US 12,297,133 B2
(45) Date of Patent: May 13, 2025

(54) SHORTCUT NITRIFICATION METHOD FOR SEWAGE TREATMENT

(71) Applicants: Xinkai Environment Investment Co., Ltd., Beijing (CN); Tianjin Huanchuang Technology Development Co., Ltd., Tianjin (CN)

(72) Inventors: Feng Hou, Beijing (CN); Ting Zhang, Beijing (CN); Xiaoxin Cao, Beijing (CN); Hongtao Pang, Beijing (CN); Yanqing Shao, Beijing (CN); Yongzhen Peng, Beijing (CN)

(73) Assignees: Xinkai Environment Investment Co., Ltd. (CN); Tianjin Huanchuang Technology Development Co., Ltd. (CN)

( * ) Notice: Subject to any disclaimer, the term of this patent is extended or adjusted under 35 U.S.C. 154(b) by 91 days.

(21) Appl. No.: 17/756,716

(22) PCT Filed: May 18, 2021

(86) PCT No.: PCT/CN2021/094450
§ 371 (c)(1),
(2) Date: Jun. 1, 2022

(87) PCT Pub. No.: WO2022/022018
PCT Pub. Date: Feb. 3, 2022

(65) Prior Publication Data
US 2023/0150855 A1   May 18, 2023

(30) Foreign Application Priority Data
Jul. 31, 2020  (CN) .......................... 202010759888.2

(51) Int. Cl.
*C02F 3/30* (2023.01)
*C02F 3/00* (2023.01)
*C02F 101/16* (2006.01)

(52) U.S. Cl.
CPC .............. *C02F 3/303* (2013.01); *C02F 3/006* (2013.01); *C02F 3/307* (2013.01); *C02F 2101/16* (2013.01); *C02F 2209/06* (2013.01); *C02F 2209/08* (2013.01); *C02F 2209/14* (2013.01); *C02F 2209/22* (2013.01); *C02F 2209/44* (2013.01); *C02F 2303/06* (2013.01); *C02F 2305/06* (2013.01)

(58) Field of Classification Search
CPC ................................................... C02F 2305/06
See application file for complete search history.

(56) References Cited

U.S. PATENT DOCUMENTS

2020/0231478 A1* 7/2020 Rhu .......................... C02F 3/34

FOREIGN PATENT DOCUMENTS

CN   110078212 A  *  8/2019 ................ C02F 3/30
DE     4407216 C1     6/1995

OTHER PUBLICATIONS

Li, et. al, Rapid start-up and stable maintenance of domestic wastewater nitritation through short-term hydroxylamine addition, Bioresource Technology, vol. 278, 2019, pp. 468-472, ISSN 0960-8524. (Year: 2019).*
Li, et. al, Hydroxylamine addition and real-time aeration control in sewage nitritation system for reduced start-up period and improved process stability, Bioresource Technology, vol. 294, 2019, 122183, ISSN 0960-8524. (Year: 2019).*
International Search Report PCT/CN2021/094450, Mailed Jul. 30, 2021.

* cited by examiner

*Primary Examiner* — Bradley R Spies
*Assistant Examiner* — Jeannie McDermott
(74) *Attorney, Agent, or Firm* — DINSMORE & SHOHL LLP

(57) ABSTRACT

The present application relates to the field of sewage treatment, and specifically relates to a shortcut nitrification method for sewage treatment. The shortcut nitrification method for sewage treatment provided in the present application comprises the following steps: adding a shortcut nitrification accelerator to sewage. The shortcut nitrification accelerator comprises 2-30 parts by weight of an inorganic hydroxylamine and 0.1-20 parts by weight of an inorganic ammonium salt. The pH of sewage is 6.5-6.95. The shortcut nitrification method for sewage treatment provided in the present application can significantly increase nitrite accumulation rate, and control a biological nitrification reaction at a stage of nitrite accumulation, thereby facilitating a wastewater denitrification process, improving the wastewater treatment effect, and having good engineering application value.

10 Claims, No Drawings

SHORTCUT NITRIFICATION METHOD FOR SEWAGE TREATMENT

CROSS-REFERENCE TO RELATED APPLICATION

This application is a 371 of International Patent Application Number PCT/CN2021/094450, filed on May 18, 2021, which claims priority to Chinese Patent Application No. 202010759888.2 filed on Jul. 31, 2020 entitled SHORTCUT NITRIFICATION METHOD FOR SEWAGE TREATMENT. The entire disclosure of each of the foregoing applications is incorporated herein by reference in its entirety.

TECHNICAL FIELD

This application relates to the field of sewage treatment, and specifically relates to a shortcut nitrification method for sewage treatment.

BACKGROUND

The basic principle of traditional biological denitrification: under aerobic conditions, ammonia nitrogen is converted into nitrite under the action of Ammonia-oxidizing Bacteria (AOB) using oxygen as electron acceptor, while consuming alkalinity, nitrite is then oxidized to nitrate under the action of Nitrite-oxidizing Bacteria (NOB), and this whole process is called nitrification. Denitrification means that Denitrification Bacteria reduce nitrate nitrogen to nitrogen and generate alkalinity with organics as electron donors under anoxic condition. The main principle of shortcut nitrification and denitrification for denitrification is to use the difference in activity of AOB and NOB to control the product of nitrification reaction to stay in the nitrite stage, and then directly carry out denitrification reaction. Shortcut nitrification has the following advantages: it can save about 25% of oxygen consumption and reduce energy consumption for aeration; reduce about 40% of carbon source, thereby reducing the cost of external carbon source; have a faster denitrification rate and reduce the reactor volume by 30-40%, thus saving capital construction investment; and have a lower sludge output and provide products for anaerobic ammonia oxidation, which is conducive to autotrophic denitrification.

The existing shortcut nitrification-denitrification and shortcut nitrification-anammox processes firstly require the realization of shortcut nitrification, but there is currently no fast and effective method for realizing shortcut nitrification, and most of the shortcut nitrification methods for urban sewage only stay at the laboratory application level. Prior art CN110078212A discloses a use method of anammox denitrification device for realizing continuous flow urban sewage, which discloses adding a large amount of ammonium salt or hydroxylamine salt to the side treatment tank through the second NOB inhibitor dosing port, and the usage environment of the ammonium salt or hydroxylamine salt is a neutral or high temperature alkaline condition, such constant temperature control and the addition of a large amount of ammonium salt or hydroxylamine salt, pH regulator will not only cause energy waste, while a large amount of ammonium salt or the addition of hydroxylamine salt will also increase the burden on the sewage treatment system, which is not conducive to the biological denitrification process. In addition, the establishment of additional sludge side treatment facilities will undoubtedly increase the infrastructure cost and floor space.

SUMMARY

The object of the present application is to overcome the need for additional sludge treatment facilities in the existing shortcut nitrification treatment of sewage, and for adding a large amount of ammonium salts or hydroxylamine salts under neutral or high temperature alkaline conditions, which will not only cause waste of energy, but also increase the burden of the sewage treatment system, however requirements for its operation control are high, which is not conducive to the shortcut nitrification process in practical projects. Therefore, the present application provides a shortcut nitrification method for sewage treatment.

To achieve the above object, the present application adopts the following technical solutions:

A shortcut nitrification method for sewage treatment comprises the steps of: adding a shortcut nitrification accelerator to sewage, wherein the shortcut nitrification accelerator comprises 2-30 parts by weight of inorganic hydroxylamine and 0.1-20 parts by weight of inorganic ammonium salt; and the pH of sewage is 6.50-6.95.

Preferably, the shortcut nitrification accelerator comprises 2-20 parts by weight of inorganic hydroxylamine and 0.1-10 parts by weight of inorganic ammonium salt.

Preferably, the amount of the shortcut nitrification accelerator is added according to the concentration of inorganic hydroxyl amine in the sewage of 2-20 mg/L.

Preferably, the amount of the shortcut nitrification accelerator is added according to the concentration of inorganic hydroxylamine in the sewage of 4-15 mg/L.

The accelerator of the present application can be mixed and added in a solid form, or the solid accelerator can be prepared into a liquid and added in a liquid form. An instrument can be used for automatic adding when liquid adding is used. The specific amount of accelerator added can be adjusted according to the water plant process and the concentration of influent and effluent. There are two addition manners of continuous addition and intermittent addition, and the intermittent addition is preferred.

Preferably, the shortcut nitrification accelerator is added to the sewage in an intermittent addition, and the frequency of addition is 1-6 times/day, the amount of each shortcut nitrification accelerator is added according to the concentration of inorganic hydroxylamine in the sewage of 2-20 mg/L, and the time of each addition is not more than 20 min.

Preferably, the frequency of addition is 4-6 times/day, and the amount of each shortcut nitrification accelerator is added according to the concentration of inorganic hydroxylamine in the sewage of 4-15 mg/L.

Preferably, the frequency of the addition of the accelerator is reduced to 1-3 times/day, when the nitrite accumulation rate in the sewage is greater than 90% and maintained stably for more than 15 days; the frequency of the addition of the accelerator is increased to 3-6 times/day, when the nitrite accumulation rate in the sewage is lower than 60% for 7 consecutive days; and the addition of the accelerator is stopped, when the nitrite accumulation rate in the sewage is greater than 90% and maintained stably for more than 60 days.

Optionally, the frequency of the addition of the accelerator is reduced to 1-3 times/day, when the nitrite accumulation rate in the sewage is greater than 90% and maintained stably for 15 to 20 days; the frequency of the addition of the accelerator is increased to 3-6 times/day, when the nitrite accumulation rate in the sewage is lower than 60% for 7 consecutive days; and the addition of the accelerator is stopped when the nitrite accumulation rate in the sewage is greater than 90% and maintained stably for 60 to 70 days.

Preferably, the inorganic hydroxylamine is selected from one or more of hydroxylamine hydrochloride, hydroxylamine sulfate and hydroxylamine phosphate; and the inorganic ammonium salt is selected from one or more of ammonium chloride, ammonium sulfate and ammonium bicarbonate.

Preferably, the shortcut nitrification treatment process of the sewage is carried out in the aerobic section of the biochemical tank, and the hydraulic retention time for the sewage in the aerobic section is 3-8 hours, and the concentration of dissolved oxygen is 1-4 mg/L.

Preferably, the sewage further contains a COD concentration of 100-400 mg/L, an ammonia nitrogen concentration of 10-70 mg/L and a sludge concentration of 2000-6000 mg/L. The sludge mentioned in the sludge concentration of the present application includes, but is not limited to, suspended sludge in sewage, and the sludge can also be sludge on fillers, or a mixture of suspended sludge and sludge on fillers.

The present application has the following beneficial effects:

(1) the shortcut nitrification method for sewage treatment provided by the present application, by adding 2-30 parts by weight of inorganic hydroxylamine and 0.1-20 parts by weight of inorganic ammonium salt to sewage with pH of 6.5-6.95, the inorganic hydroxylamine can directly participate in the metabolic process of ammonia-oxidizing bacteria and shorten the enzymatic reaction process as the substrate of hydroxylamine oxidase, and inhibit the activity of nitrite-oxidizing bacteria at the same time, thereby achieving shortcut nitrification, it can also be used as a cell activator to accelerate cell growth at the same time; the inorganic ammonium salts can be used as a substrate for the growth of ammonia-oxidizing bacteria and participate in the shortcut nitrification reaction. The ammonium ions dissolved in water will generate free ammonia at the same time, which will inhibit the activity of nitrite-oxidizing bacteria, thereby strengthening the realization of shortcut nitrification. In the present application, the sewage is treated with the above-mentioned specific amount of inorganic hydroxylamine and inorganic ammonium salt under the condition of pH 6.5-6.95, which can greatly reduce the usage amount of the accelerator, significantly improve the nitrite accumulation rate, and control the biological nitrification reaction in the stage having nitrite accumulation, so as to contribute to the process of denitrification of sewage, accelerate the process of shortcut nitrification reaction, improve the treatment effect of wastewater, and reduce the total nitrogen content of sewage. The method of the present application can increase the growth rate of AOB bacteria by 2-10 times, reduce the growth rate of NOB bacteria by 5-100 times, and save about 25% of aeration energy consumption and 40% of carbon source.

The shortcut nitrification method for sewage treatment provided by the present application has the advantages of simple formula of accelerator and easy preparation. The accelerator can be directly added to the biochemical tank, and microorganisms are domesticated in the biochemical tank, and no measures such as sludge side treatment are required. The nitrite produced by the method can provide a substrate for anammox bacteria to achieve autotrophic denitrification and further improve the denitrification effect. At the same time, the method of the present application also has the following advantages:

1) The method is simple to operate and can directly add the shortcut nitrification accelerator into the sewage treatment biochemical tank system, which can maintain the activity of AOB, and at the same time selectively inhibit the activity of NOB, so as to realize shortcut nitrification and have obvious effect and great application value.

2) The method is economical and feasible, can save the cost of adding carbon source and aeration, and has the advantages of low addition of shortcut nitrification accelerator, economical efficiency and remarkable effect, which is convenient for popularization and application.

3) The method is stable and effective, and a good shortcut nitrification and denitrification effect can still be maintained by reducing the amount of the addition of accelerators in the later stage.

(2) Further, in the shortcut nitrification method for sewage treatment provided by the present application, the amount of the shortcut nitrification accelerator is added according to the concentration of inorganic hydroxylamine in the sewage of 2-20 mg/L. The nitrite accumulation rate can be further improved by controlling the concentration of inorganic hydroxylamine in the sewage to be 2-20 mg/L according to the present application.

(3) Further, in the shortcut nitrification method for sewage treatment provided by the present application, the shortcut nitrification accelerator is added into the sewage in an intermittent addition, and the frequency of the addition is 1-6 times/day, and the amount of each shortcut nitrification accelerator is added according to the concentration of inorganic hydroxylamine in the sewage of 2-20 mg/L, and the time of each addition is not more than 20 min.

The present application adopts the intermittent addition to add the shortcut nitrification accelerator into the sewage, and controls the addition frequency, the addition amount, and the time of each addition, which is beneficial to the improvement of the accumulation rate of the nitrite and the realization of the shortcut nitrification process.

(4) Further, in the shortcut nitrification method for sewage treatment provided by the present application, the shortcut nitrification treatment process of the sewage is carried out in the aerobic section of the biochemical tank. By controlling the shortcut nitrification treatment process of the sewage to be carried out in the aerobic section of the biochemical tank, it is beneficial to speed up the shortcut nitrification reaction process and improve the treatment effect of the waste water.

DETAILED DESCRIPTION

The following embodiments are provided for a better understanding of the present application, and are not limited to the best embodiments, and do not limit the content and protection scope of the present application. Any product identical or similar to the present application obtained by teaching from the present application and combining with the features of other prior art shall fall within the protection scope of the present application.

If the specific experimental steps or conditions are not indicated in the embodiments, it can be carried out according to the operations or conditions of the conventional experimental steps described in the literature in this field. The reagents or instruments used without the manufacturer's description are all conventional reagent products that can be commercially available.

The calculation method of the nitrite accumulation rate described in the following embodiments and comparative examples of the present application is:

Nitrite accumulation rate/%=the mass concentration of nitrite in the sewage at the outlet of the aerobic section/(the initial mass concentration of ammonia nitrogen in the sewage−the mass concentration of ammonia nitrogen in the sewage at the outlet of the aerobic section).

Example 1

The present embodiment provided a shortcut nitrification method for sewage treatment, comprising the following steps:

1) In a sewage treatment facility, the sewage contained an organic pollutant COD concentration of 400 mg/L, an ammonia nitrogen concentration of 70 mg/L and a sludge concentration of 4000 mg/L, and the pH of the sewage was 6.8. The sewage was continuously introduced into the aerobic section of the biochemical tank, the hydraulic retention time of the sewage in the aerobic section was 7 hours, and the concentration of dissolved oxygen was 3 mg/L. Then a shortcut nitrification accelerator was added to the sewage in the aerobic section in an intermittent addition (the shortcut nitrification accelerator was composed of 5 parts by weight of ammonium chloride and 10 parts by weight of hydroxylamine hydrochloride), the frequency of the addition was 4 times/day, the shortcut nitrification accelerator was added each time according to the amount of 10 mg/L of hydroxylamine concentration in the sewage, and the time of each addition was 15 min.

2) The nitrite accumulation rate in the sewage at the outlet of the aerobic section was detected every day. The frequency of the addition of the accelerator was reduced to 2 times/day when the nitrite accumulation rate in the sewage was greater than 90% and maintained stably for 15 days; the addition of the accelerator was stopped when the nitrite accumulation rate in the sewage was greater than 90% and maintained stably for 61 days. At this time, the nitrite accumulation rate in the sewage at the outlet of the aerobic section was detected to be 95%.

Example 2

The present embodiment provided a shortcut nitrification method for sewage treatment, comprising the following steps:

1) In a sewage treatment facility, the sewage contained an organic pollutant COD concentration of 100 mg/L, an ammonia nitrogen concentration of 10 mg/L and a sludge concentration of 2000 mg/L, and the pH of the sewage was 6.5. The sewage was continuously introduced into the aerobic section of the biochemical tank, the hydraulic retention time of the sewage in the aerobic section was 3 hours, and the concentration of dissolved oxygen was 1 mg/L. Then a shortcut nitrification accelerator was added to the sewage in the aerobic section in an intermittent addition (the shortcut nitrification accelerator was composed of 0.1 parts by weight of ammonium sulfate and 2 parts by weight of hydroxylamine phosphate), the frequency of the addition was 6 times/day, the shortcut nitrification accelerator was added each time according to the amount of 2 mg/L of hydroxylamine concentration in the sewage, and the time of each addition was 10 min.

2) The nitrite accumulation rate in the sewage at the outlet of the aerobic section was detected every day. The frequency of the addition of the accelerator was reduced to 3 times/day when the nitrite accumulation rate in the sewage was greater than 90% and maintained stably for 16 days; the frequency of the addition of the accelerator was increased to 5 times/day when the nitrite accumulation rate in the sewage was lower than 60% for 7 consecutive days; and the addition of the accelerator was stopped when the nitrite accumulation rate in the sewage was greater than 90% and maintained stably for 62 days. At this time, the nitrite accumulation rate in the sewage at the outlet of the aerobic section was detected to be 90%.

Example 3

The present embodiment provided a shortcut nitrification method for sewage treatment, comprising the following steps:

1) In a sewage treatment facility, the sewage contained an organic pollutant COD concentration of 300 mg/L, an ammonia nitrogen concentration of 50 mg/L and a sludge concentration of 6000 mg/L, and the pH of the sewage was 6.95. The sewage was continuously introduced into the aerobic section of the biochemical tank, the hydraulic retention time of the sewage in the aerobic section was 8 hours, and the concentration of dissolved oxygen was 4 mg/L. Then a shortcut nitrification accelerator was added to the sewage in the aerobic section in an intermittent addition (the shortcut nitrification accelerator was composed of 20 parts by weight of ammonium bicarbonate and 30 parts by weight of hydroxylamine sulfate), the frequency of the addition was 4 times/day, the shortcut nitrification accelerator was added each time according to the amount of 20 mg/L of hydroxylamine concentration in the sewage, and the time of each addition was 20 min;

2) The nitrite accumulation rate in the sewage at the outlet of the aerobic section was detected every day. The frequency of the addition of the accelerator was reduced to 2 times/day when the nitrite accumulation rate in the sewage was greater than 90% and maintained stably for 16 days; the frequency of the addition of the accelerator was increased to 3 times/day when the nitrite accumulation rate in the sewage was lower than 60% for 7 consecutive days; and the addition of the accelerator was stopped when the nitrite accumulation rate in the sewage was greater than 90% and maintained stably for 60 days. At this time, the nitrite accumulation rate in the sewage at the outlet of the aerobic section was detected to be 91%.

Example 4

The present embodiment provided a shortcut nitrification method for sewage treatment, comprising the following steps:

1) In a sewage treatment facility, the sewage contained an organic pollutant COD concentration of 200 mg/L, an ammonia nitrogen concentration of 40 mg/L and a sludge concentration of 3000 mg/L, and the pH of the sewage was 6.8. The sewage was continuously introduced into the aerobic section of the biochemical tank, the hydraulic retention time of the sewage in the aerobic section was 5 hours, and the concentration of dissolved oxygen was 3 mg/L. Then a shortcut nitrification accelerator was added to the sewage in the aerobic section in an intermittent addition (the shortcut nitrification accelerator was composed of 10 parts by weight of ammonium chloride and 20 parts by weight of hydroxylamine hydrochloride), the frequency of the addition was 5 times/day, the shortcut nitrification accelerator was added each time according to the amount of hydroxylamine concentration in the sewage of 4 mg/L, and the time of each addition was 20 min.

2) The nitrite accumulation rate in the sewage at the outlet of the aerobic section was detected every day. The frequency of the addition of the accelerator was reduced to 3 times/day, when the nitrite accumulation rate in the sewage was greater than 90% and maintained stably for 15 days; the frequency of the addition of the accelerator was increased to 4 times/day when the nitrite accumulation rate in the sewage was lower than 60% for 7 consecutive days; and the addition of the accelerator was stopped when the nitrite accumulation rate in the sewage was greater than 90% and maintained stably for 60 days. At this time, the nitrite accumulation rate in the sewage at the outlet of the aerobic section was detected to be 90%.

Example 5

The present embodiment provided a shortcut nitrification method for sewage treatment, comprising the following steps:

1) In a sewage treatment facility, the sewage contained an organic pollutant COD concentration of 200 mg/L, an ammonia nitrogen concentration of 40 mg/L and a sludge concentration of 3000 mg/L, and the pH of the sewage was 6.9. The sewage was continuously introduced into the aerobic section of the biochemical tank, the hydraulic retention time of the sewage in the aerobic section was 6 hours, and the concentration of dissolved oxygen was 3 mg/L. Then a shortcut nitrification accelerator was added to the sewage in the aerobic section in an intermittent addition (the shortcut nitrification accelerator was composed of 8 parts by weight of ammonium chloride and 17 parts by weight of hydroxylamine hydrochloride), the frequency of the addition was 5 times/day, the shortcut nitrification accelerator was added each time according to the amount of hydroxylamine concentration in the sewage of 15 mg/L, and the time of each addition was 20 min.

2) The nitrite accumulation rate in the sewage at the outlet of the aerobic section was detected every day. The frequency of the addition of the accelerator was reduced to 3 times/day, when the nitrite accumulation rate in the sewage was greater than 90% and maintained stably for 15 days; the addition of the accelerator was stopped, when the nitrite accumulation rate in the sewage was greater than 90% and maintained stably for 60 days. At this time, the nitrite accumulation rate in the sewage at the outlet of the aerobic section was detected to be 90%.

Comparative Example 1

The present embodiment provided a shortcut nitrification method for sewage treatment, comprising the following steps: In a sewage treatment facility, the sewage contained an organic pollutant COD concentration of 400 mg/L, an ammonia nitrogen concentration of 70 mg/L and a sludge concentration of 4000 mg/L, and the pH of the sewage was 6.8. The sewage was continuously introduced into the aerobic section of the biochemical tank, the hydraulic retention time of the sewage in the aerobic section was 7 hours, and the concentration of dissolved oxygen was 3 mg/L. The nitrite accumulation rate in the sewage at the outlet was monitored each day, and the nitrite accumulation rate in the sewage at the outlet of the aerobic section was 2% after 61 days.

Obviously, the above-mentioned embodiments are only examples for clear description, and are not intended to limit the implementation manner. For those of ordinary skill in the art, changes or modifications in other different forms can also be made on the basis of the above description. There is no need and cannot be exhaustive of all implementations here. And the obvious changes or changes derived from this are still within the protection scope of the present application.

The invention claimed is:

1. A shortcut nitrification method for sewage treatment, comprising the steps of: adding a shortcut nitrification accelerator to sewage, wherein the shortcut nitrification accelerator comprises 2-30 parts by weight of inorganic hydroxylamine and 0.1-20 parts by weight of inorganic ammonium salt; and the pH of sewage is 6.50-6.95;
   wherein the shortcut nitrification accelerator is added to the sewage in an intermittent addition, and the frequency of addition is 1-6 times/day, the amount of each shortcut nitrification accelerator is added according to the concentration of inorganic hydroxylamine in the sewage of 2-20 mg/L, and the time of each addition is not more than 20 min,
   wherein the shortcut nitrification treatment process of the sewage is carried out in the aerobic section of a biochemical tank, the hydraulic retention time for the sewage in the aerobic section is 3-8 hours, and the concentration of dissolved oxygen is 1-4 mg/L, and
   wherein the sewage further contains a COD concentration of 100-400 mg/L, an ammonia nitrogen concentration of 10-70 mg/L and a sludge concentration of 2000-6000 mg/L.

2. The shortcut nitrification method for sewage treatment of claim 1, wherein the shortcut nitrification accelerator comprises 2-20 parts by weight of inorganic hydroxylamine and 0.1-10 parts by weight of inorganic ammonium salt.

3. The shortcut nitrification method for sewage treatment of claim 1, wherein the amount of the shortcut nitrification accelerator is added according to the concentration of inorganic hydroxylamine in the sewage of 4-15 mg/L.

4. The shortcut nitrification method for sewage treatment of claim 1, wherein the frequency of addition is 4-6 times/day, and the amount of each shortcut nitrification accelerator is added according to the concentration of inorganic hydroxylamine in the sewage of 4-15 mg/L.

5. The shortcut nitrification method for sewage treatment of claim 1, wherein the frequency of the addition of the accelerator is reduced to 1-3 times/day, when the nitrite accumulation rate in the sewage is greater than 90% and maintained stably for more than 15 days;
   the frequency of the addition of the accelerator is increased to 3-6 times/day, when the nitrite accumulation rate in the sewage is lower than 60% for 7 consecutive days; and
   the addition of the accelerator is stopped, when the nitrite accumulation rate in the sewage is greater than 90% and maintained stably for more than 60 days.

6. The shortcut nitrification method for sewage treatment of claim 1, wherein the inorganic hydroxylamine is selected from one or more of hydroxylamine hydrochloride, hydroxylamine sulfate and hydroxylamine phosphate; and
   the inorganic ammonium salt is selected from one or more of ammonium chloride, ammonium sulfate and ammonium bicarbonate.

7. The shortcut nitrification method for sewage treatment of claim 2, wherein the amount of the shortcut nitrification accelerator is added according to the concentration of inorganic hydroxylamine in the sewage of 4-15 mg/L.

8. The shortcut nitrification method for sewage treatment of claim 2, wherein the frequency of addition is 4-6 times/day, and the amount of each shortcut nitrification accelerator is added according to the concentration of inorganic hydroxylamine in the sewage of 4-15 mg/L.

9. The shortcut nitrification method for sewage treatment of claim 2, wherein the frequency of the addition of the accelerator is reduced to 1-3 times/day, when the nitrite accumulation rate in the sewage is greater than 90% and maintained stably for more than 15 days;
   the frequency of the addition of the accelerator is increased to 3-6 times/day, when the nitrite accumulation rate in the sewage is lower than 60% for 7 consecutive days; and
   the addition of the accelerator is stopped, when the nitrite accumulation rate in the sewage is greater than 90% and maintained stably for more than 60 days.

10. The shortcut nitrification method for sewage treatment of claim 2, wherein the inorganic hydroxylamine is selected from one or more of hydroxylamine hydrochloride, hydroxylamine sulfate and hydroxylamine phosphate; and
   the inorganic ammonium salt is selected from one or more of ammonium chloride, ammonium sulfate and ammonium bicarbonate.

* * * * *